(12) United States Patent
Dong et al.

(10) Patent No.: US 10,950,217 B1
(45) Date of Patent: Mar. 16, 2021

(54) ACOUSTIC QUADRUPOLE SYSTEM FOR HEAD MOUNTED WEARABLE DEVICE

(71) Applicant: AMAZON TECHNOLOGIES, INC., Seattle, WA (US)

(72) Inventors: Jianchun Dong, Palo Alto, CA (US); Xuan Zhong, Mountain View, CA (US); Chun Sik Jeong, Los Gatos, CA (US); Zhen Xu, Santa Clara, CA (US); Chung-Ling Hsu, Sunnyvale, CA (US); Jung Sik Yang, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 206 days.

(21) Appl. No.: 15/839,472

(22) Filed: Dec. 12, 2017

Related U.S. Application Data

(60) Provisional application No. 62/560,884, filed on Sep. 20, 2017.

(51) Int. Cl.
| | |
|---|---|
| *G10K 11/178* | (2006.01) |
| *G02B 27/01* | (2006.01) |
| *H04R 1/10* | (2006.01) |
| *H04R 1/46* | (2006.01) |

(52) U.S. Cl.
CPC .... *G10K 11/17857* (2018.01); *G02B 27/0176* (2013.01); *H04R 1/1066* (2013.01); *H04R 1/46* (2013.01); *G02B 2027/0178* (2013.01)

(58) Field of Classification Search
CPC .... G10K 11/17857; H04R 1/46; H04R 1/403; H04R 1/406; H04R 1/34; H04R 1/40; H04R 3/12; H04R 5/00; H04R 25/407; H04R 9/16; H04R 11/12; H04R 17/08; H04R 19/10; G02B 2027/0178
See application file for complete search history.

(56) References Cited

U.S. PATENT DOCUMENTS

| | | | | |
|---|---|---|---|---|
| 2,552,878 | A * | 5/1951 | Wiggins | H04R 1/38 381/173 |
| 5,212,732 | A * | 5/1993 | Hipps | H04R 1/227 381/307 |
| 6,478,108 | B1 * | 11/2002 | Linhard | H04R 1/345 181/141 |
| 6,995,659 | B2 * | 2/2006 | Soto-Nicolas | H04R 1/225 340/384.1 |

(Continued)

*Primary Examiner* — Fan S Tsang
*Assistant Examiner* — Angelica M McKinney
(74) *Attorney, Agent, or Firm* — Lindauer Law, PLLC

(57) ABSTRACT

A head-mounted wearable device (HMWD) provides audio output using acoustic quadrupole units (AQU). The AQU produces an acoustic pattern having a first region and a second region. The first region has a first phase and the second region has a second phase that is opposite the first phase. A major axis extending through the regions is directed generally upwards from the ear canal of the user. The ear of the user is within the first region. The second region is directed upward. Bystanders are within an acoustically null region of the acoustic pattern. The acoustically null region is perpendicular to the major axis. Within the acoustically null region, the sound intensity is reduced due to destructive interference between the first phase and the second phase. As a result, the user wearing the HMWD is able hear audio output while audio amplitude perceived by the bystanders is significantly reduced.

20 Claims, 11 Drawing Sheets

(56) References Cited

U.S. PATENT DOCUMENTS

| | | | | |
|---|---|---|---|---|
| 8,750,541 | B1* | 6/2014 | Dong | H04R 3/12 |
| | | | | 381/182 |
| 8,766,940 | B1 | 7/2014 | Starner et al. | |
| 9,482,882 | B1 | 11/2016 | Hanover et al. | |
| 10,391,935 | B2* | 8/2019 | Konno | H04R 1/403 |
| 2005/0094843 | A1* | 5/2005 | Soto-Nicolas | H04R 1/225 |
| | | | | 381/423 |
| 2008/0219485 | A1* | 9/2008 | Kantola | H04R 3/005 |
| | | | | 381/303 |
| 2013/0051585 | A1* | 2/2013 | Karkkainen | H04R 1/1075 |
| | | | | 381/151 |
| 2014/0079260 | A1* | 3/2014 | Kuster | H04R 25/405 |
| | | | | 381/313 |
| 2016/0212526 | A1* | 7/2016 | Salvatti | H04R 1/44 |
| 2016/0255434 | A1* | 9/2016 | Yamamoto | H04R 3/12 |
| | | | | 381/305 |
| 2018/0167710 | A1* | 6/2018 | Silver | H04R 1/1075 |
| 2019/0052954 | A1* | 2/2019 | Rusconi Clerici Beltrami | |
| | | | | H04R 1/1008 |

* cited by examiner

ACOUSTIC QUADRUPOLE SYSTEM FOR HEAD MOUNTED WEARABLE DEVICE

PRIORITY

This application claims priority to U.S. Provisional Patent Application Ser. No. 62/560,884 filed on Sep. 20, 2017, entitled "Acoustic Quadrupole System For Head-Mounted Wearable Device." The entirety of this previously filed application is hereby incorporated by reference.

BACKGROUND

Wearable devices provide many benefits to users, allowing easier and more convenient access to information and services. Wearable devices may provide output that is audible to the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
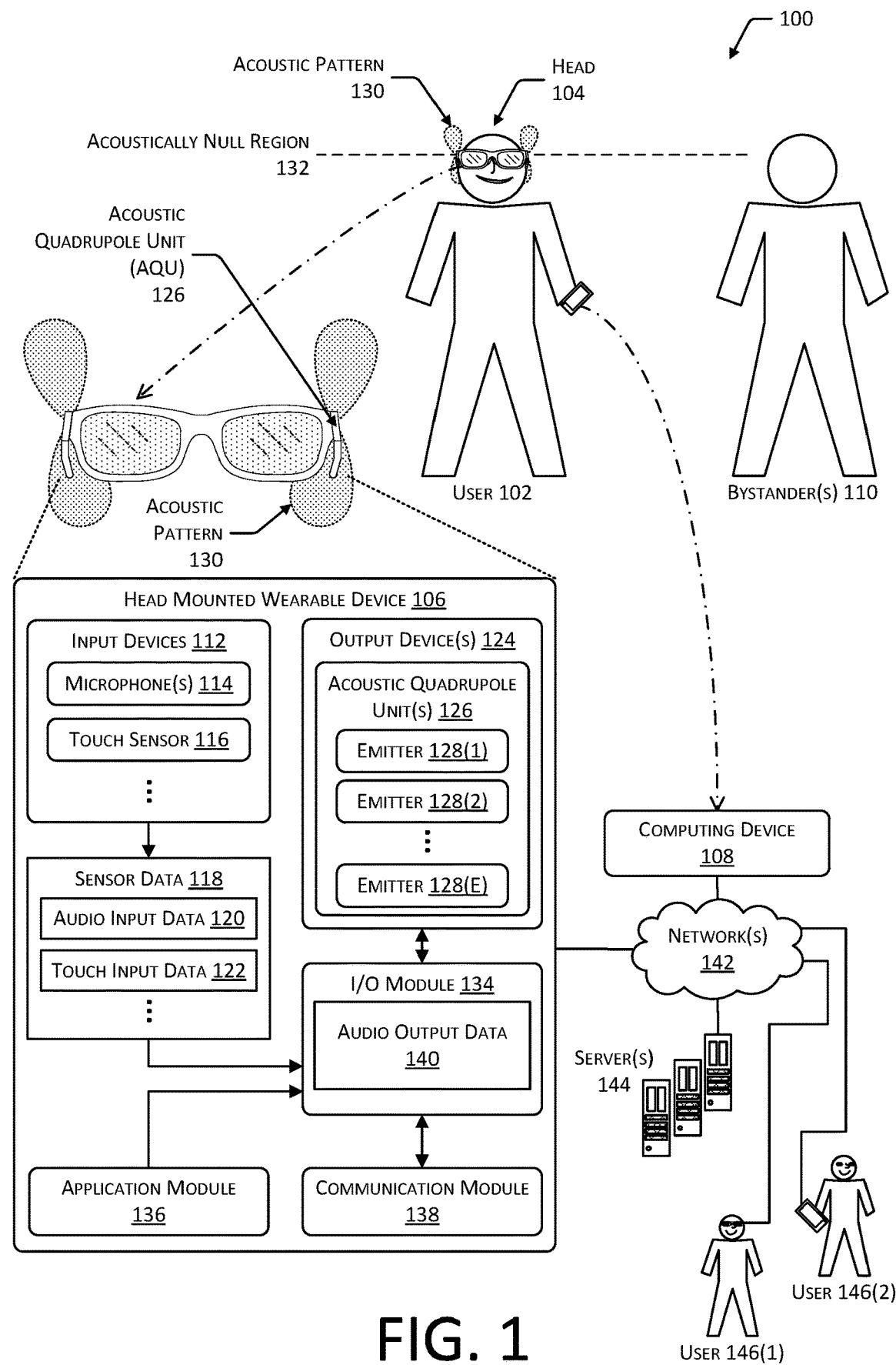
FIG. 1 depicts a system including a head-mounted wearable device equipped with acoustic quadrupole units (AQU), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor that is ubiquitous and easily worn, such as eyeglasses, may facilitate access to information.

The HMWD may operate independently as a standalone device, or may operate in conjunction with another computing device. For example, the HMWD may operate in conjunction with a smart phone, tablet, network service operating on servers, and so forth. The HMWD includes input devices and output devices that provide a user interface to the user. In one implementation, the HMWD may use the computing device to provide access to a wide area network, compute resources, data storage, a display for image output, and so forth.

Among the input devices, the HMWD may include one or more microphones, such as an air conduction microphone (ACM) that detects sounds transferred by air or a bone conduction microphone (BCM) that detects sounds transferred by another medium such as the head of the user, and so forth. The HMWD may also include an ambient light sensor (ALS).

Among the output devices, the HMWD may include one or more acoustic quadrupole units (AQUs), a visual indicator device (VID), and so forth. As described below, the AQU provides sound that may be audible to the user during operation.

The visual indicator device is capable of producing a visual signal that may be perceptible to the user who is wearing the HMWD. The visual signal may be presented along a portion of an interior of a front frame of the HMWD that is positioned in front of the user's face during normal wear. For example, the visual indicator device may comprise a light emitting diode (LED) that emits light from an opening of an inner cover of the front frame. During normal wear of the HMWD, the frame of the HMWD is within the user's field of view.

Among the input devices, the HMWD may include an air conduction (AC) microphone that detects sounds transferred by air, a bone conduction (BC) microphone that detects sounds transferred by another medium such as the head of the user, and so forth.

The HMWD may be used in situations in which bystanders are present. In such situations, it is desirable to allow the user wearing the HMWD to be able to listen to audio output without being obtrusive to those bystanders. Additionally, the user may not wish the audio to be intelligible to the bystanders. For example, the user may not wish to have the audio of a telephone call heard by the bystanders. Additionally, the user of the HMWD may not wish to obscure their ears and their hearing of the ambient environment. For example, the user may not wish to wear earplugs that would prevent conversation with bystanders or obscure the user's ability to hear what is happening nearby.

The HMWD may use AQUs to produce sound that is audible to the user and inaudible or at least unobtrusive to bystanders. The AQU utilizes acoustic quadrupoles to form an acoustic pattern having an acoustically null region that encompasses an expected location of the ears of bystanders.

The acoustic pattern produced by the AQU may include a first region of sound having a first phase that is directed generally towards the ear of the user wearing the HMWD, while a second region of sound having a second phase opposite the first phase is directed generally upward. The sound produced by the AQU is audible to the user, while the bystanders are generally positioned in the acoustically null region formed by the AQU during operation. Within this acoustically null region, the first phase and second phase sounds cancel one another out. The acoustic pattern may be measured by sampling sound pressure levels at a constant distance but different orientation with respect to the AQU.

The AQU may comprise one or more emitters that produce sound with a first phase and a second phase, where the first and second phases are opposite or out of phase. For example, the AQU may comprise an emitter with a diaphragm that is driven by a transducer, such as a voice coil. The transducer converts electrical signals into mechanical motion. For example, the transducer may move the diaphragm to displace air, producing sound. Each emitter may have, or be connected to, one or more outlet ports that convey the sound to the outside environment. The diaphragm acts as a pair of acoustic point sources with opposing outputs that are 180 degrees out of phase. For example, when driven, a first side of the diaphragm produces a positive sound pressure compression wave with a first amplitude while the opposite second side of the diaphragm produces a negative sound pressure rarefaction wave with the first amplitude.

In one implementation, an asymmetrical lateral arrangement of a pair of dipole emitters may be used. Each dipole emitter may have an upper outlet port arranged on an upper surface of a temple of the HMWD and a lower outlet port arranged on a lower surface of the temple. The pair of dipoles may be driven such that the two upper outlet ports produce sound with the first phase while the two lower outlet ports produce sound with the second phase.

In another implementation, a transducer mounted within a chassis may be used. The chassis may include various passageways or channels that direct sound of particular phase produced by the transducer to a plurality of outlet ports. For example, the single emitter may have four outlet ports separated by some distance from one another, with two outlet ports emitting sound with a first phase, and two outlet ports emitting sound with a second phase. The outlet ports may be arranged on an exterior surface of the temple that is opposite the interior surface that is proximate to a head of the user while the HMWD is being worn.

By utilizing the devices and techniques described, sound from the AQU may be audible to a user wearing the HMWD, while reducing one or more of the intelligibility or amplitude of sound perceived by bystanders. This improves privacy for the user while also minimizing adverse impact on bystanders resulting from hearing unwanted audio.

Illustrative System

FIG. 1 depicts a system 100 in which a user 102 is wearing on their head 104 a head-mounted wearable device (HMWD) 106 in a general form factor of eyeglasses. The HMWD 106 may incorporate hinges to allow the temples of the eyeglasses to fold. The HMWD 106 may include one or more lenses. The lenses may be shaped to provide a particular refractive effect on light rays, such as in the case of prescription lenses.

The HMWD 106 may be in communication with one or more affiliated computing devices 108. For example, the HMWD 106 may communicate with the computing device 108 using a personal area network (PAN) such as Bluetooth. The computing device 108 may be used at least in part to provide additional resources, such as access to the network, compute resources, storage, display output, and so forth. The computing devices may comprise a smart phone, tablet, local server, in vehicle computer system, and so forth. For example, the computing device 108 may comprise a smart phone that includes a display. The display of the smart phone may be used to present a graphical user interface.

In some situations, there may be bystanders 110 near the HMWD 106. For example, the user 102 wearing the HMWD 106 may be standing in a crowd, sitting on a bus, sitting in an auditorium, walking down a street, and so forth.

The HMWD 106 may include one or more input devices 112. For example, the HMWD 106 may include one or more of a microphone 114, touch sensor 116, button, ambient light sensor (ALS), and so forth. The input devices 112 may produce sensor data 118.

In some implementations a sensor may be used to determine if the HMWD 106 is being worn or not. For example, a proximity sensor may be used to determine if the head 104 of the user 102 is near the HMWD 106. Operation of the acoustic quadrupole unit (AQU) 126 may be changed responsive to whether the user 102 is wearing the HMWD 106 or not. For example, when not being worn, the AQU 126 may be configured to provide a different acoustic pattern 130. Continuing the example, when doffed, the HMWD 106 may configure the AQU 126 to operate in a dipole or monopole mode that does not exhibit the acoustically null region 132, or exhibits a smaller acoustically null region 132, than described above.

The microphones 114 may include one or more of bone conduction microphones (BCM) or air conduction microphones (ACM), and so forth. The microphones 114 are used to produce audio input data 120. For example, the BCM may comprise an accelerometer, gyroscope, vibration sensor, and so forth that detect the vibrations in the head of the user 102 that result from utterances of the user 102. The ACM may comprise a diaphragm or other elements that move in response to the displacement of air by sound waves. The audio input data 120 may comprise digitized audio, such as pulse code modulated (PCM) audio data.

The touch sensor 116 may be located on one or more of the temples of the HMWD 106. The touch sensor 116 may comprise a capacitive touch sensor, a force sensitive resistor touch sensor, an optical touch sensor, and so forth. The touch sensor 116 may generate touch input data 122 that is indicative of the location, direction, duration and so forth of the touch. For example, the touch input data 122 may comprise a serialized data stream indicative of particular points on the touch sensor 116 that detect a touch.

The ALS may generate light sensor data. The light sensor data may comprise information about the ambient lighting proximate to the HMWD 106. The light sensor data may include intensity data and color data. Other sensors may provide other sensor data 118.

The HMWD 106 may include one or more output devices 124. For example, the HMWD may include one or more acoustic quadrupole units (AQU) 126, visual indicator devices (VID), haptic output devices, and so forth.

The AQU 126 may include one or more emitters 128. The emitters 128 are configured to produce acoustic or audio output. For example, the emitters 128 may include a transducer that displaces a diaphragm to cause sound waves comprising compression and rarefaction in air. During operation, an emitter 128 may operate as either an acoustic monopole, acoustic dipole, or acoustic quadrupole. For example, each emitter 128 may operate as an acoustic dipole having two outlet ports. A single diaphragm within the emitter 128 may be moved with an electromagnet to product vibrations in the air, and thus sound. The sound on a first side of the diaphragm exhibits a first phase and exits through a first outlet port while the sound on the second side of the diaphragm exhibits a second phase that is 180 degrees different from the first phase and exits through a second outlet port. For example, when the diaphragm moves to the left it creates a compression wave (wave front of greater density) in the air and simultaneously to the right of the diaphragm it creates a rarefaction (area of lesser density).

The AQU 126 utilizes a quadrupole that produces two outputs of a first phase and two outputs of a second phase. For example, the AQU 126 may comprise two acoustic dipoles. In another example, the AQU 126 may comprise a single emitter with a chassis that includes ducts to direct sound with the first phase to particular outlets and sound with the second phase to other outlets.

During operation, the AQU 126 produces an acoustic pattern 130. The acoustic pattern 130 may be expressed as a region having a surface upon which a predetermined value of sound pressure is measured. The acoustic pattern 130 produced by the AQU 126 may include at least two regions arranged in a "dumbbell" or "figure eight" configuration. For example, a first region may extend from one side of the AQU 126 and a second region may extend from an opposite side of the AQU 126. The regions may be aligned along a major axis extending through a long axis of each of the regions. In some implementations other acoustic patterns 130 may be used. For example, the acoustic pattern 130 may comprise four regions. The acoustic pattern 130 may be approximately symmetrical. The major axis of acoustic pattern 130 may be aligned to extend upwards and away from where the ear of the user 102 is expected to be while the device is being worn. For example, the ear of the user 102 is within a lower region while the upper region extends upwards and away from the head 104.

The AQU 126 uses a plurality of ports that radiate sound of different phases to produce a sharper and more tightly defined acoustic pattern 130. For example, an acoustic monopole may produce a pattern that is omnidirectional and exhibits no directionality in one plane, while a dipole produces a pattern with two broad regions exhibiting little directionality and a slight null. In comparison, the AQU 126 may be operated to produce an interaction between the sound emitted in the outlet ports that produces a more compact two-region configuration with greater directivity. As a result of this greater directivity, the AQU 126 produces an acoustically null region 132 in the acoustic pattern 130 between the two regions of the AQU 126 that encompasses a greater spatial region compared to the directivity pattern of a dipole.

During operation, the sound pressure, amplitude, or apparent volume of sound produced by the AQU 126 during operation is significantly reduced at or near the acoustically null region 132, relative to within the regions. For example, at a distance of 1 meter, the sound pressure at the acoustically null region 132 may be 30 decibels (dB) less than that measured at 1 meter along the major axis. As described above, because the acoustic pattern 130 of the AQU 126 exhibits greater directivity than other speaker arrangements, the spatial region within which the sound produced by the AQU 126 is larger than that produced by a dipole. As a result, bystanders 110 with their ears within the acoustically null region 132 will experience audio that is significantly attenuated, compared to the user 102 who has their ear within one of the regions. As a result, the privacy of the audio presented to the user 102 is improved, potential for distraction or annoyance of bystanders 110 is reduced, and so forth.

The HMWD 106 may include an input/output (I/O) module 134. The I/O module 134 may be configured to receive sensor data 118 from input devices 112, control output devices 124, and so forth.

The HMWD 106 may include an application module 136. The application module 136 may provide an application such as a contact management application that provides information about people to the user 102. For example, the application module 136 may send information to the I/O module 134 for presentation to the user 102. The I/O module 134 may generate audio output data 140. The audio output data 140 may comprise digitized data that may be used to operate control circuitry that drives the AQU 126 to produce sound.

The HMWD 106 may also include a communication module 138. The communication module 138 may be configured to establish communication with other devices. The communication module 138 may use one or more communication interfaces to establish communication with the other devices via one or more networks 142. For example, the network 142 may comprise a personal area network, local area network, metropolitan area network, wide area network, and so forth. The HMWD 106 may use the networks 142 to access one or more services that are provided by the other devices. For example, the HMWD 106 may establish communication with one or more servers 144. These one or more servers 144 may provide one or more services, such as automated speech recognition, information retrieval, messaging, and so forth.

The communication module 138 may also be used to establish communications with one or more other users 102. For example, the user 102 of the HMWD 106(1) may initiate a realtime call (RTC) with the user 146(1) who is also wearing a HMWD 106(2). Audio associated with the RTC may be transferred using the network 142. Management of the call may be facilitated by one or more services executing on the one or more servers 144. The HMWD 106 may also be used to facilitate communication with other devices. For example, the HMWD 106(1) used by the user 102 may be used to establish communication with a user 146(2) that is using an application executing on a computing device 108(2). Audio of the RTC may be provided to the I/O module 134 that generates audio output data 140 that is subsequently used to drive the AQU 126, producing sound for the user 102 to hear.

While the HMWD 106 is described in the form factor of eyeglasses, the HMWD 106 may be implemented in other form factors. For example, the HMWD 106 may comprise a device that is worn behind an ear of the user 102, on a headband, as a necklace, on the shoulders, as jewelry, and so forth. In some implementations, the HMWD 106 may be deployed as a system, comprising several physically separate devices that operate in conjunction with one another.

Figure 2:
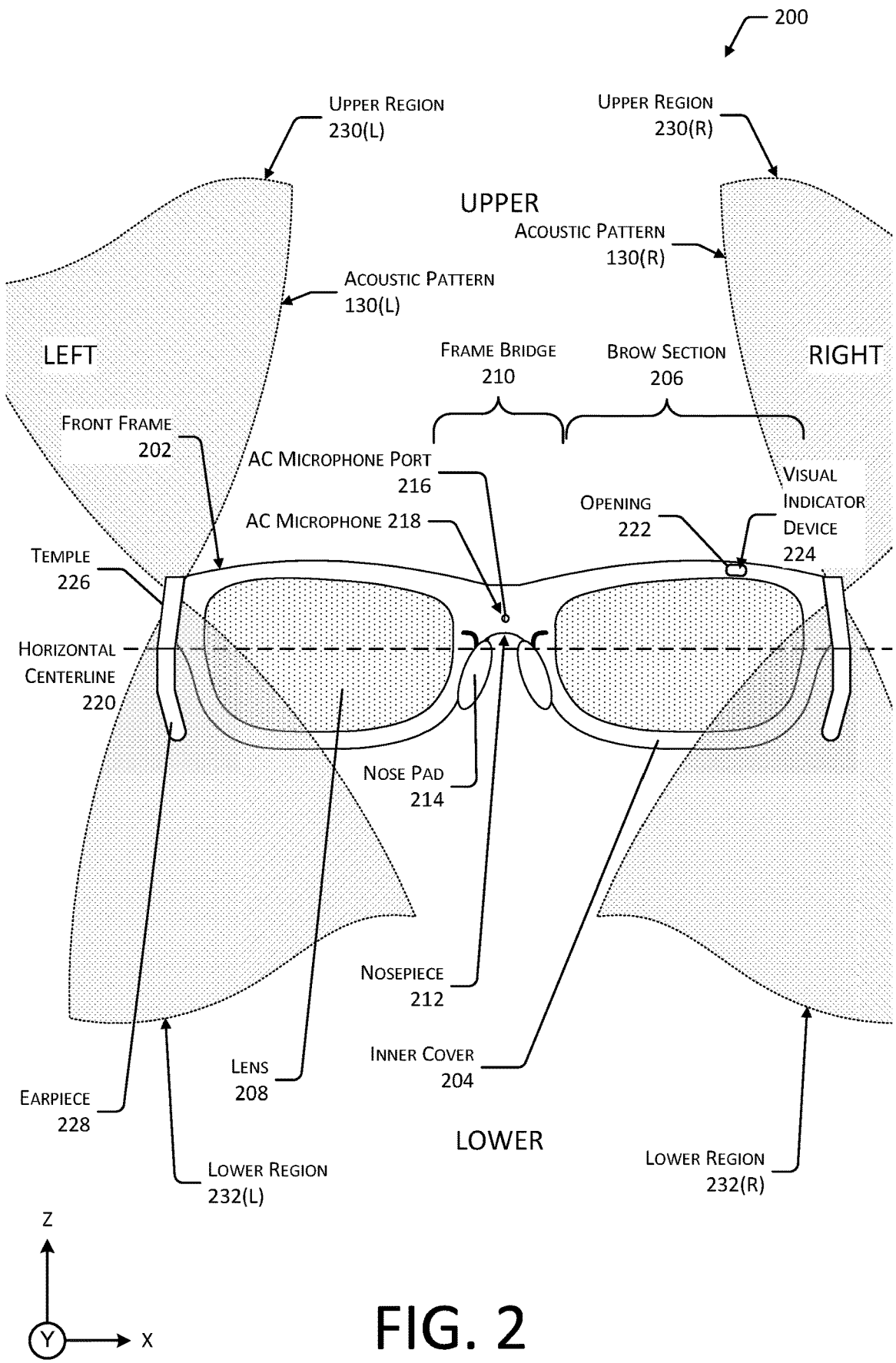
FIG. 2 depicts a view of a head-mounted wearable device, according to some implementations.

FIG. 2 depicts a view 200 of a HMWD 106, according to some implementations. This view is from the point of view of a user 102.

The HMWD 106 comprises a front frame 202. The front frame 202 may comprise cavities or spaces for various devices. An inner cover 204 is arranged on an interior side of the front frame 202 and closes or conceals those cavities or spaces. The inner cover 204 may be affixed to the front frame 202 by way of mechanical interference fit, fasteners, adhesives, and so forth.

The front frame 202 may include a left brow section 206(L) and a right brow section 206(R). Each brow section 206 may include a lens 208. A frame bridge 210 joins the left brow section 206(L) and the right brow section 206(R).

In some implementations, the front frame 202 may comprise a single piece of material, such as a metal, plastic, ceramic, composite material, and so forth. For example, the front frame 202 may comprise 6061 aluminum alloy that has been milled to the desired shape and to provide space for devices within. In another example, the front frame 202 may comprise injection molded plastic. In other implementations, the front frame 202 may comprise several discrete pieces that are joined together by way of mechanical engagement features, welding, adhesive, and so forth.

The lenses 208 may have specific refractive characteristics, such as in the case of prescription lenses. The lenses 208 may be clear, tinted, photochromic, electrochromic, and so forth. For example, the lenses 208 may comprise plano (non-prescription) tinted lenses to provide protection from the sun. In some implementations, only a single lens 208 may be installed, or the lenses 208 may be omitted.

A nosepiece 212 may be affixed to the frame bridge 210. One or more nose pads 214 may be affixed to, or integral with, the nosepiece 212. The nose pads 214 aid in the support of the front frame 202 and may improve comfort of the user 102.

The inner cover 204 at the frame bridge 210 may include an air conduction microphone (ACM) port 216. The ACM port 216 may comprise a passageway or hole through the inner cover 204 that allows sound vibrations to be conveyed to an ACM 218 located within the frame bridge 210.

Depicted is a horizontal centerline 220. The horizontal centerline 220 may extend through the optical centers of the lenses 208. For example, the horizontal centerline 220 may extend from left to right. In other implementations the centerline may be referenced to other points or features. For example, instead of an optical center, the centerline may be aligned to a geometric center of the lens 208.

The inner cover 204 includes one or more openings 222 to provide for visibility of a visual indicator device (VID) 224. The opening 222 may provide a passage through which illumination produced by the visual indicator device 224 may pass.

In some implementations, instead of or in addition to an opening 222, the inner cover 204 may be translucent, transparent, or include a window through which the light from the visual indicator device 224 is visible to the user 102. For example, the inner cover 204 may comprise translucent plastic that transmits at least a portion of the light emitted by a light of the visual indicator device 224.

The opening 222 may be placed in an upper right quadrant of the right brow section 206(R), such as shown here. This places the light from the visual indicator device 224 within the field of view of the user 102. The opening 222 may be positioned at other locations on the inner cover 204, such as proximate to the temple 226. In other implementations additional openings 222 may be present, additional visual indicator devices 224 may be present, and so forth.

An earpiece 228 may extend from a portion of the temple 226 that is distal to the front frame 202. The earpiece 228 may comprise a material that may be reshaped to accommodate the anatomy of the head 104 of the user 102. For example, the earpiece 228 may comprise a thermoplastic that may be warmed to a predetermined temperature and reshaped. In another example, the earpiece 228 may comprise a wire that may be bent to fit. The wire may be encased in an elastomeric material.

The HMWD 106 may include one or more AQUs 126. In this illustration, an AQU 126 is positioned in each of the temples 226. Each AQU 126 produces an acoustic pattern 130 that comprises an upper region 230 and a lower region 232. The upper region 230 has a first sound amplitude while the lower region 232 has a second sound amplitude. In some implementations the first sound amplitude and the second sound amplitude may be the same. The lower region 232 is directed such that it encompasses at least a portion of the ear of the user 102. For example, the lower region 232(L) for the left AQU 126(L) may encompass a portion of the pinna. The upper region 230 extends upwards and away from the temple 226 and the head 104 of the user 102. As described above, the acoustic pattern 130 includes an acoustically null region 132 between the upper region 230 and the lower region 232, and exhibits a third sound amplitude that is less than the first sound amplitude and the second sound amplitude. In some implementations the acoustic pattern 130 may include two or more upper regions 230 and two or more lower regions 232.

Figure 3:
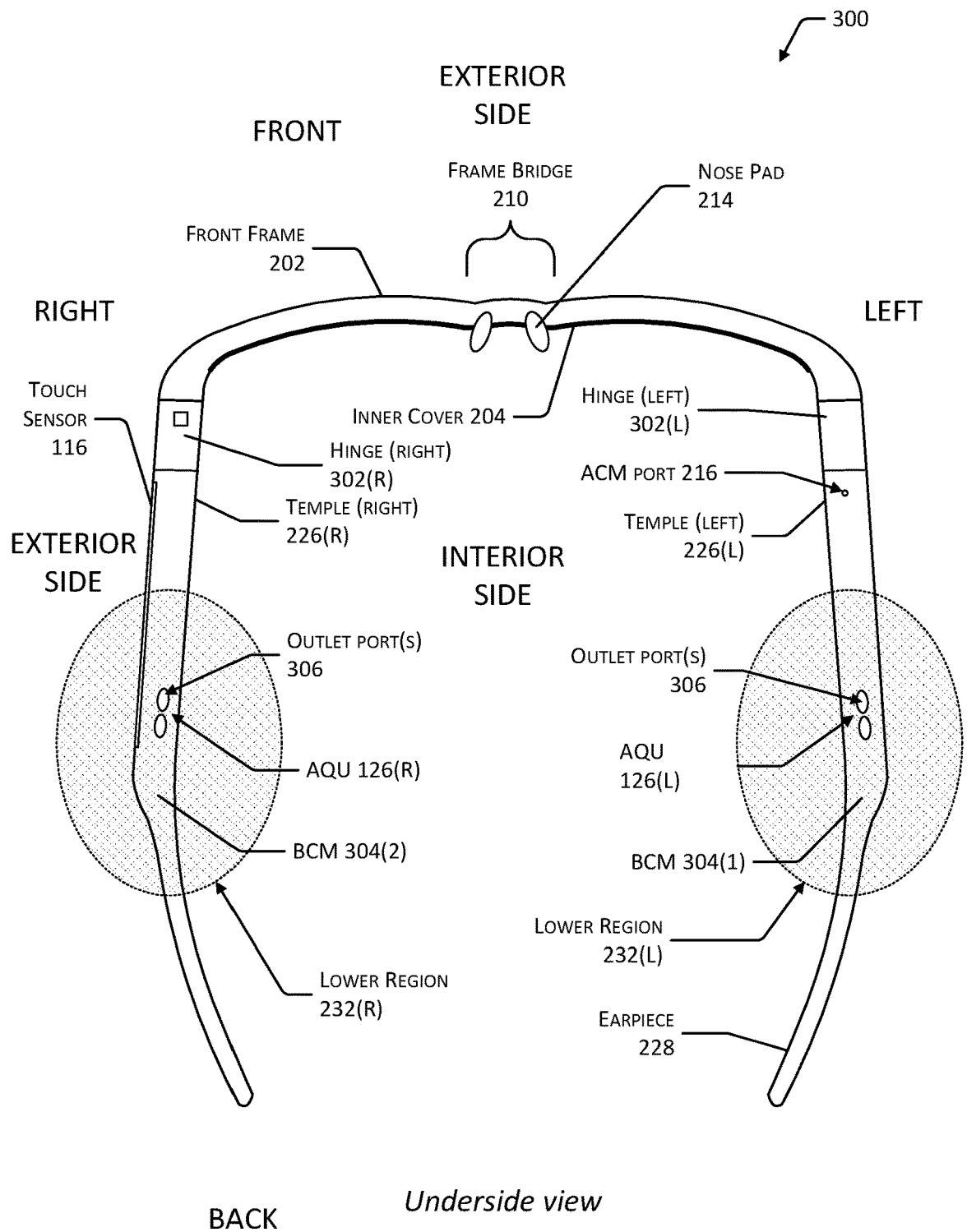
FIG. 3 depicts an exterior view, from below, of the head-mounted wearable device in an unfolded configuration, according to some implementations.
Figure 3:
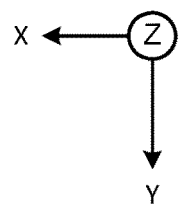

FIG. 3 depicts an exterior view 300, from below, of an underside of the HMWD 106 in an unfolded configuration, according to some implementations. In this view, the front frame 202 is visible along with the inner cover 204.

One or more hinges 302 may be affixed to, or an integral part of, the front frame 202. Depicted are a left hinge 302(L) and a right hinge 302(R) on the left and right sides of the front frame 202, respectively. The left hinge 302(L) is arranged at the left brow section 206(L), distal to the frame bridge 210. The right hinge 302(R) is arranged at the right brow section 206(R) distal to the frame bridge 210.

The temple 226 may couple to a portion of the hinge 302. For example, the temple 226 may comprise one or more components, such as a knuckle, that mechanically engage one or more corresponding structures on the hinge 302.

The left temple 226(L) is attached to the left hinge 302(L) of the front frame 202. The right temple 226(R) is attached to the right hinge 302(R) of the front frame 202.

The hinge 302 permits rotation of the temple 226 with respect to the hinge 302 about an axis of rotation. The hinge 302 may be configured to provide a desired angle of rotation. For example, the hinge 302 may allow for a rotation of between 0 and 120 degrees. As a result of this rotation, the HMWD 106 may be placed into a folded configuration. For example, each of the hinges 302 may rotate by about 90 degrees inward with the temples 226 moving toward the front frame 202.

One or more of the front frame 202, the hinge 302, or the temple 226 may be configured to dampen the transfer of vibrations between the front frame 202 and the temples 226. For example, the hinge 302 may incorporate vibration damping structures or materials to attenuate the propagation of vibrations between the front frame 202 and the temples 226. These vibration damping structures may include elastomeric materials, springs, and so forth. In another example, the portion of the temple 226 that connects to the hinge 302 may comprise an elastomeric material.

One or more different sensors or other input devices 112 may be placed on the HMWD 106. For example, the touch sensor 116 may be arranged along an exterior surface of the right temple 226(R). In another example, a first ACM 218(1) may be located at the frame bridge 210, while a second ACM 218(2) is located in the left temple 226(L), a third ACM 218(3) is located in the right temple 226(R), and so forth. In another example, an ACM 218(4) may be located within or proximate to the left hinge 302(L), such as on the underside of the left hinge 302(L). The ACMs 218 may have corresponding ACM ports 216. For example, the ACM 218 may have an ACM port 216 that provides a passageway between the exterior environment and the ACM 218.

The ACM 218 may comprise a diaphragm, MEMS element, or other elements that move in response to the displacement of air by sound waves. Data produced by the ACM 218 may be generated that is indicative of the sound detected by the ACM 218. For example, the audio input data 120 may be generated based on input from one or more ACMs 218.

The HMWD 106 may include one or more BCMs 304. The BCM 304 is responsive to the vibrations produced by the user 102, such as while speaking. For example, the BCM 304 may comprise an accelerometer, gyroscope, vibration sensor, and so forth that detect the vibrations in the head of the user 102 that result from utterances of the user 102. The BCM 304 may be arranged to be in contact with the skin above a bony or cartilaginous structure. For example, where the HMWD 106 is in the form of eyeglasses, nose pads 214 of a nosepiece 212 may be mechanically coupled to the BCM 304 such that vibrations of the nasal bone, glabella, or other structures upon which the nose pads 214 may rest are transmitted to the BCM 304. In other implementations, the BCM 304 may be located elsewhere with respect to the HMWD 106, or worn elsewhere by the user 102. For example, the BCM 304 may be incorporated into the temple 226 of the HMWD 106, a hat, or headband.

The HMWD 106 may include one or more AQUs 126. For example, a first AQU 126(L) is located in the left temple 226(L) and a second AQU 126(R) is located in the right temple 226(R). The AQU 126 is designed to produce vibrations in the surrounding air using one or more acoustic quadrupoles. For example, the AQU 126 may include one or more emitters 128, each emitter 128 comprising a diaphragm that is moved by a voice coil to generate sound waves in the air. The AQU 126 may use one or more mechanisms to generate sound waves. These mechanisms may include but are not limited to: electromagnets such as voice coils, piezoelectric devices, metallic ribbon devices, magnetostrictive devices, electrostatic devices, and so forth. The AQU 126 may operate to produce sound between 500 Hertz (Hz) and 20 kHz.

The AQU 126 may have one or more outlet ports 306 that allow sound to be transferred from the AQU 126 to the surrounding environment. The outlet port 306 may comprise one or more holes that provide a passageway or hole through an exterior housing to the exterior environment. In some implementations the outlet port 306 may be covered or filled with a grill, mesh, fabric, elastomeric material, and so forth. The outlet ports 306 may have the same size and shape, or may have different sizes and shapes. For example, the outlet port 306 that is closest to the ear of the user 102 when the HMWD 106 is being worn may be larger than the other outlet ports 306.

In this illustration, a portion of the lower regions 232 for each of the respective AQU 126 are shown. In some implementations, the acoustic pattern 130 may include two or more lower regions 232, such as one corresponding to each of the outlet ports 306.

One or more buttons may be placed in other locations on the HMWD 106. For example, a button may be emplaced within, or proximate to, the right hinge 302(R), such as on an underside of the right hinge 302(R).

One or more components of the HMWD 106 may comprise single unitary pieces or may comprise several discrete pieces. For example, the front frame 202 and the nosepiece 212 may comprise a single piece, or may be constructed from several pieces joined or otherwise assembled.

Figure 4:
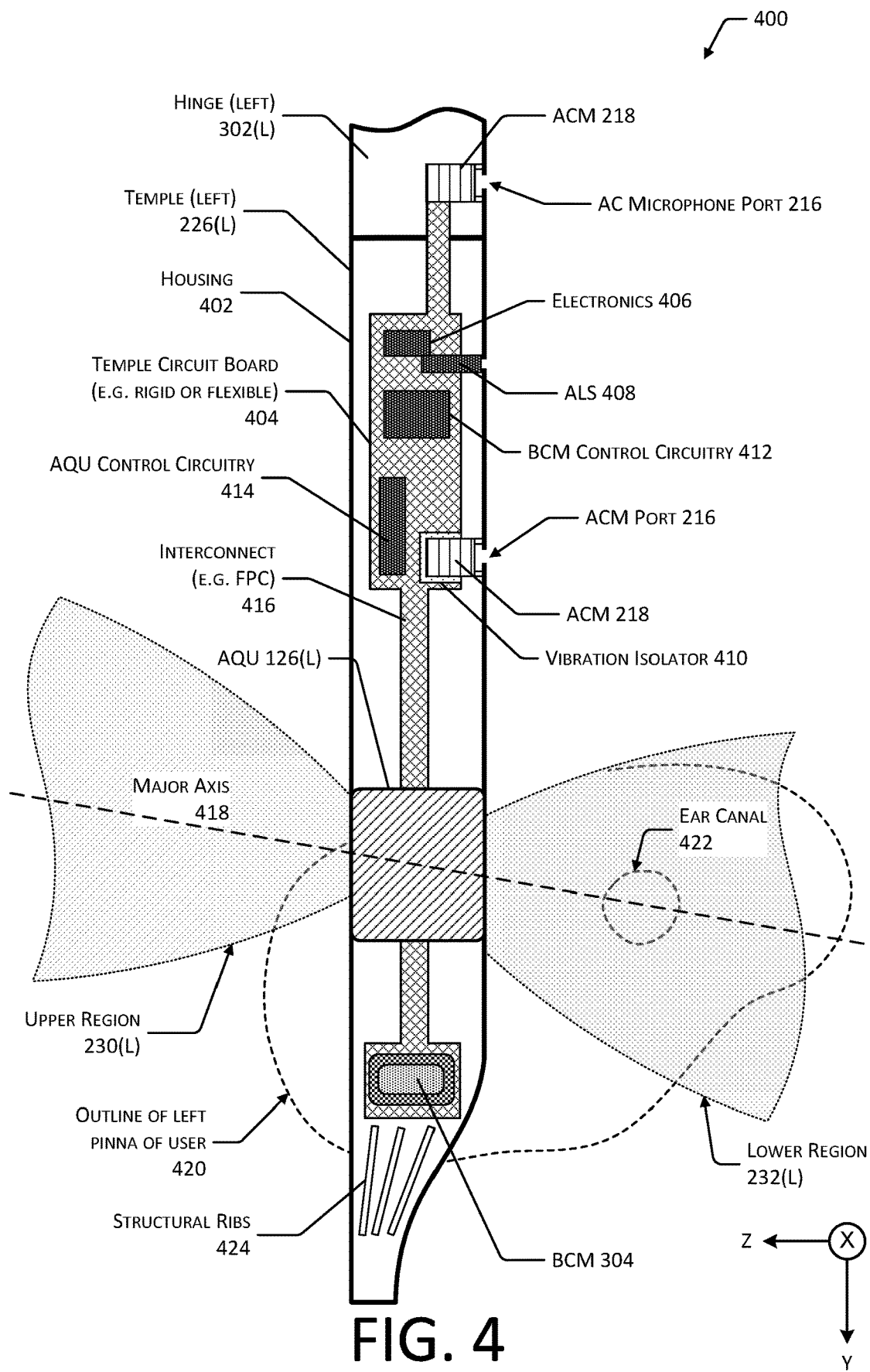
FIG. 4 depicts a view of some of the internal components of a temple of a head-mounted wearable device, according to some implementations.

FIG. 4 depicts a view 400 of some of the internal components of a left temple 226(L) of a HMWD 106, according to some implementations. The depiction of the left temple 226(L) is provided by way of example and not necessarily as a limitation. For example, the same or similar structures as described herein may be installed in the right temple 226(R).

A portion of the hinge 302 is depicted. Arranged within the hinge 302 is ACM 218. An ACM port 216 for the ACM 218 in the hinge 302 is depicted. The ACM port 216 may open generally downwards. For example, the aperture of the ACM port 216 may be on a bottom surface of the hinge 302 and may open towards the feet of the user 102 during normal wear.

As described above, the hinge 302 is coupled to a temple 226. The temple 226 may comprise a housing 402. The housing 402 may comprise one or more elements that serve to enclose at least a portion of the temple 226. The housing 402 may comprise a plastic, metal, ceramic, composite material, and so forth.

A temple circuit board 404 is depicted. The temple circuit board 404 may comprise a rigid or flexible circuit board. For example, the temple circuit board 404 may comprise a flexible printed circuit. In some implementations, the temple circuit board 404 may extend at least partially into the hinge 302. For example, the ACM 218 may be connected to the temple circuit board 404.

Electronics 406 may be connected to, affixed to, or otherwise in communication with the temple circuit board 404. For example, integrated circuits may be laminated to the temple circuit board 404. For example, an ALS 408 may be mounted to the temple circuit board 404. A hole or window in the housing 402 may allow the sensors in the ALS 408 to detect ambient light. The window may be located on the underside as shown here, or on any other side of the temple 226. In other implementations the ALS 408 may be located elsewhere on the HMWD 106. For example, the ALS 408 may be located in the front frame 202. In another example, the ALS 408 may be mounted such that the hole or window is on an exterior surface of the temple 226, such as on a side of the temple 226 that is opposite the head 104 of the user 102.

In some implementations, a vibration isolator 410 may be used to provide some attenuation of mechanical vibration between the temple circuit board 404 and the ACM 218(2). For example, the vibration isolator 410 may comprise an elastomeric material such as a viscoelastic foam, acoustic foam, and so forth. In another example, the vibration isolator 410 may comprise a flexible member such as a living hinge, pleated material, flexible printed circuit board, and so forth. By attenuating the transfer of the mechanical vibration from the AQU 126 to the ACM 218(2), the input to the ACM 218(2) may include less noise.

The electronics 406 may include BCM control circuitry 412 that is configured to acquire data from the BCM 304 and produce audio input data 120.

The electronics 406 may include AQU control circuitry 414. The AQU control circuitry 414 accepts audio output data 140 as input and generates one or more drive signals. For example, the I/O module 134 may provide the audio output data 140 to the AQU control circuitry 414. In one implementation, the AQU control circuitry 414 may comprise a digital to analog converter (DAC) and a power amplifier. The DAC converts the output data to an analog signal, which may then be amplified using the power amplifier to produce the drive signal. The drive signal is then provided to the one or more emitters 128 of the AQU 126. The one or more emitters 128 may utilize a movable element, such as a diaphragm, that displaces air to produce sound.

The AQU control circuitry 414 may be configured to deliver different electrical signals to drive the emitters 128 in particular ways. For example, the AQU control circuitry 414 may comprise a digital-to-analog converter (DAC) that changes sound that is digitally represented as audio output data into an analog waveform. The analog waveform may then be amplified and provided to the transducer in the emitters 128. In some implementations the AQU control circuitry 414 may generate different electrical signals to drive different transducers. For example, the AQU control circuitry 414 may introduce a phase difference between a first electrical signal being sent to a first transducer in a first emitter 128 and a second electrical signal being sent to a second transducer in a second emitter 128.

As described below with regard to FIG. 7, the AQU 126 may comprise a pair of emitters 128(1)-(2), each comprising an acoustic dipole. By providing a first electrical signal to the first emitter 128(1) and a second electrical signal to the second emitter 128(2) various operating modes may be obtained. For example, by introducing a phase delay such that the second electrical signal is 180 degrees out of phase with respect to the first electrical signal, the pair of emitters 128(1)-(2) operates as an acoustic quadrupole.

In other situations, it may be useful to not produce the particular acoustic pattern 130 with the acoustically null region 132. For example, when the HMWD 106 is not being worn, the first electrical signal and the second electrical signal may be of the same phase, driving the pair of emitters 128(1)-(2) as a combined acoustic dipole.

An interconnect 416 may be used to connect the temple circuit board 404 to one or more of the AQU 126, the BCM 304, and so forth. The interconnect 416 may comprise a flexible printed circuit, wiring harness, and so forth to provide an electrical connection. In some implementations, the interconnect 416 may comprise an extension of the temple circuit board 404.

The AQU 126 may be connected to, or may include, one or more outlet ports 306. The outlet ports 306 may be located at one or more locations on the temple 226, such as described below. During operation, the acoustic pattern 130 is produced as described above. The acoustic pattern 130 includes a major axis 418. The major axis 418 may comprise a line that extends along a long axis of each of the upper region 230 and the lower region 232.

Also depicted is an approximate location of an outline of a pinna 420 of the left ear of the user 102 when the HMWD 106 is being worn. Also shown is an approximate location of an ear canal 422 of the user's 102 left ear. As shown here, the major axis 418 of the acoustic pattern 130 is arranged such that the ear canal 422 is within the lower region 232. For example, as depicted here, the lower edge of the major axis 418 may pass through the ear canal 422. In other implementations, the major axis 418 may be arranged at other angles.

While the AQU 126 is depicted as being within the housing 402 of the temple 226, in other implementations the AQU 126 or portions thereof may be outside of the housing 402. For example, the emitters 128 may be positioned outside of the housing 402.

Depicted in this illustration are structural ribs 424. The structural ribs 424 may be used to add rigidity to a distal portion of the temple 226. The structural ribs 424 may also improve structural support for the earpiece 228 (not shown).

Figure 5:
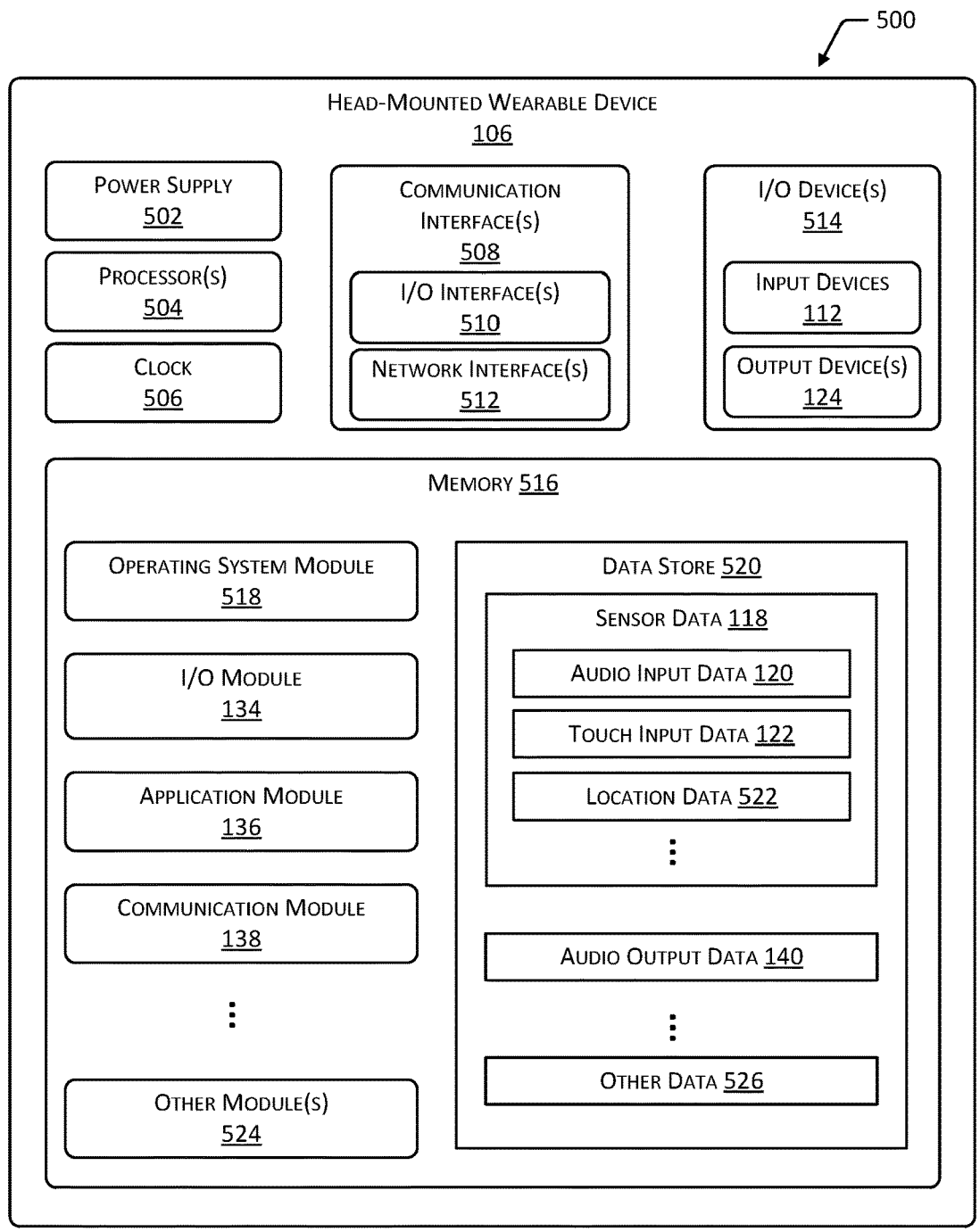
FIG. 5 is a block diagram of electronic components of the head-mounted wearable device, according to some implementations.

FIG. 5 is a block diagram 500 of components of the head-mounted wearable device 106, according to some implementations.

One or more power supplies 502 may be configured to provide electrical power suitable for operating the components in the HMWD 106. The one or more power supplies 502 may comprise batteries, capacitors, fuel cells, photovoltaic cells, wireless power receivers, conductive couplings suitable for attachment to an external power source such as provided by an electric utility, and so forth. For example, the batteries on board the HMWD 106 may be charged wirelessly, such as through inductive or capacitive power transfer. In another implementation, electrical contacts may be used to recharge the HMWD 106.

The HMWD 106 may include one or more hardware processors 504 (processors) configured to execute one or more stored instructions. The processors 504 may comprise one or more cores. The processors 504 may include general purpose microprocessors, microcontrollers, application specific integrated circuits (ASICs), digital signal processors (DSPs), and so forth. One or more clocks 506 may provide information indicative of date, time, ticks, and so forth. For example, the processor 504 may use data from the clock 506 to associate a particular interaction with a particular point in time.

The HMWD 106 may include one or more communication interfaces 508 such as input/output (I/O) interfaces 510, network interfaces 512, and so forth. The communication interfaces 508 enable the HMWD 106, or components thereof, to communicate with other devices or components. The communication interfaces 508 may include one or more I/O interfaces 510. The I/O interfaces 510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O devices 514. The I/O devices 514 may include input devices 112. The input devices 112 may include but are not limited to, the touch sensor 116, the ALS 408, the ACM 218, the BCM 304, a camera, a proximity sensor, a barometer, a light sensor, an inertial measurement unit (IMU), a biomedical sensor, a magnetometer, and so forth. The IMU may comprise one or more of accelerometers or gyroscopes. Motion data may be acquired from the IMU. For example, the motion data may be used for fitness tracking, navigation, augmented reality, virtual reality, and so forth. The biomedical sensor may include one or more of a pulse sensor, oximeter, electrocardiograph, encephalograph, electromyograph, respirometer, and so forth. Biomedical data may be acquired from one or more of the biomedical sensors. For example, the biomedical data may be used for fitness tracking.

The I/O devices 514 may also include output devices 124. The output devices 124 may include but are not limited to one or more AQU 126, the VID 224, haptic output devices, and so forth.

In some embodiments, the I/O devices 514 may be physically incorporated with the HMWD 106 or may be externally placed. The output devices 124 are configured to generate signals, which may be perceived by the user 102 or may be detected by input devices 112.

The network interfaces 512 may be configured to provide communications between the HMWD 106 and other devices, such as the server 144. The network interfaces 512 may include devices configured to couple to personal area networks (PANs), wired or wireless local area networks (LANs), wide area networks (WANs), and so forth. For example, the network interfaces 512 may include devices compatible with Ethernet, Wi-Fi, Bluetooth, Bluetooth Low Energy, ZigBee, and so forth.

The HMWD 106 may also include one or more buses or other internal communications hardware or software that allow for the transfer of data between the various modules and components of the HMWD 106.

As shown in FIG. 5, the HMWD 106 includes one or more memories 516. The memory 516 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 516 provides storage of computer-readable instructions, data structures, program modules, and other data for the operation of the HMWD 106. A few examples of functional modules are shown stored in the memory 516, although the same functionality may alternatively be implemented in hardware, firmware, or as a system on a chip (SoC).

The memory 516 may include at least one operating system (OS) module 518. The OS module 518 is configured to manage hardware resource devices such as the I/O interfaces 510, the I/O devices 514, the communication interfaces 508, and provide various services to applications or modules executing on the processors 504. The OS module 518 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 516 may be a data store 520 and one or more of the following modules. These modules may be executed as foreground applications, background tasks, daemons, and so forth. The data store 520 may use a flat file, database, linked list, tree, executable code, script, or other data structure to store information. In some implementations, the data store 520 or a portion of the data store 520 may be distributed across one or more other devices including servers 144, network attached storage devices, and so forth.

The I/O module 134 may be stored in the memory 516. The I/O module 134 performs functions such as controlling the operation of one or more of the input devices 112, output devices 124, and so forth.

The memory 516 may store the sensor data 118 as described above. The sensor data 118 may include location data 522 that is indicative of a location of the HMWD 106. The location data 522 may indicate a latitude and longitude, country, state, city, street address, zip code, and so forth. The location data 522 may be obtained from an input device 112 such as a satellite radionavigation system, from an external source such as a cellular data network, and so forth. The location data 522 may be used by the I/O module 134 to operate the AQU 126. For example, different sound settings may be used based on the location data 522, the time of day, and so forth.

The memory 516 may store one or more application modules 136. For example, the application module 136 may comprise functionality such as providing calendar reminders, presenting information to the user 102, and so forth.

The memory 516 may store the communication module 138 that is configured to establish communications with one or more of the computing devices 108, other HMWDs 106, servers 144, input devices 112, or other devices. The communications may be authenticated, encrypted, and so forth.

During operation, the HMWD 106 may store sensor data 118 or other data at least temporarily, in the data store 520. Other modules 524 may also be present in the memory 516 as well as other data 526 in the data store 520. For example, the other modules 524 may include a contact management module while the other data 526 may include address information associated with a particular contact, such as an email address, telephone number, network address, uniform resource locator, and so forth.

Figure 6:
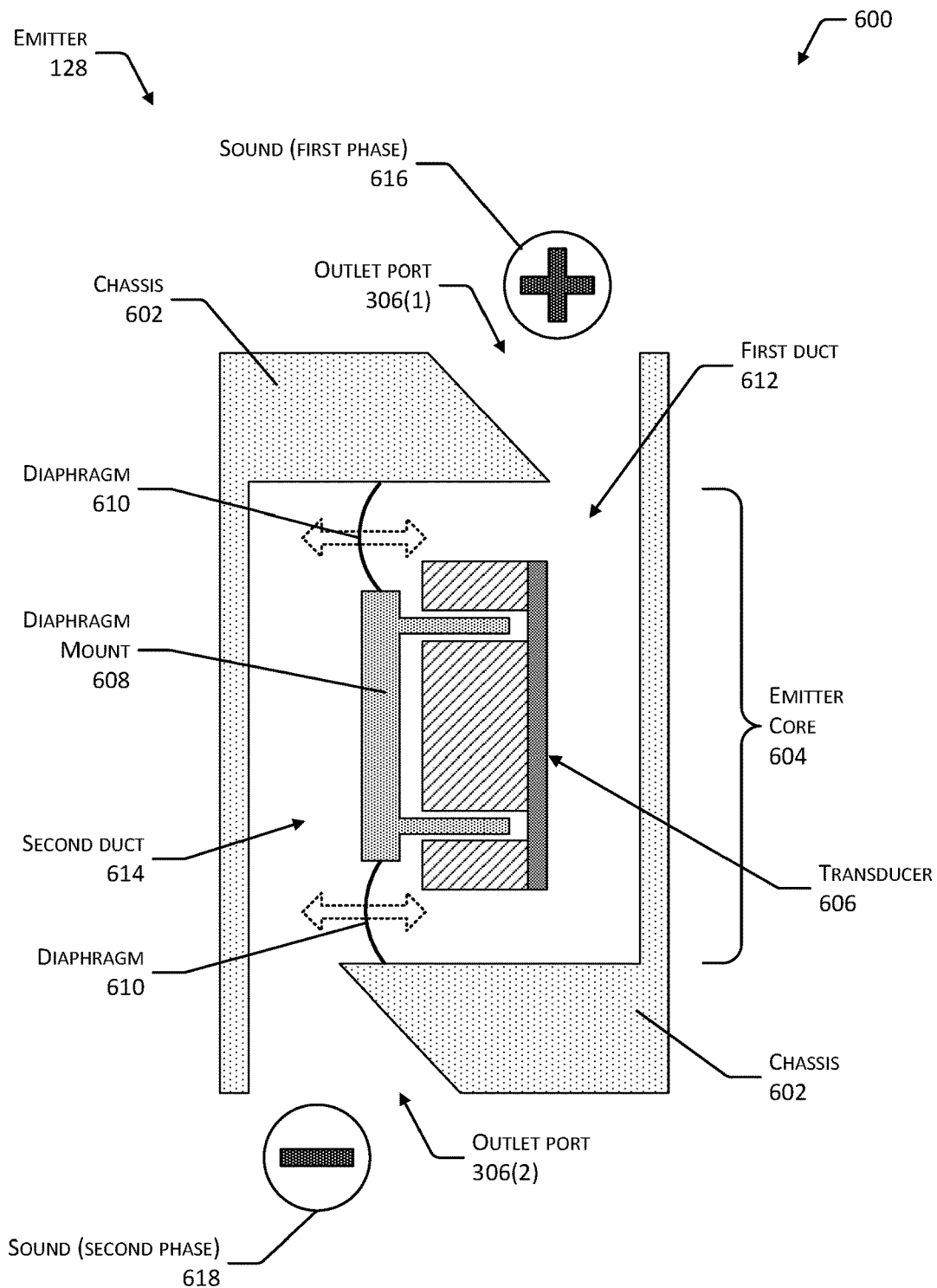
FIG. 6 is a cross-sectional diagram of an emitter of the AQU, according to one implementation.

FIG. 6 is a cross-sectional diagram 600 of an emitter 128 of the AQU 126, according to one implementation. The emitter 128 may comprise a chassis 602. The chassis 602 may comprise a unitary piece, or a plurality of pieces. The chassis 602 may be contained by or joined to the housing 402. For example, one or more fasteners may be used to retain the chassis 602 within the housing 402. The chassis 602 provides a physical structure that maintains the relative position of the components in the AQU 126 with respect to one another, and may also include ducts that direct sound as described below. The chassis 602 may comprise a plastic, glass, composite material, metal, and so forth. The chassis 602 may be produced using additive manufacturing, milling, injection molding, and so forth.

Supported by the chassis 602 is an emitter core 604. The emitter core 604 includes a transducer 606 that produces mechanical motion in a diaphragm mount 608 responsive to an electrical signal. For example, the transducer 606 may comprise a voice coil electromagnet that is magnetically coupled to the diaphragm mount 608. As the electrical signal changes over time, the magnetic field produced by the transducer 606 changes, moving the diaphragm mount 608 with respect to the transducer 606.

A diaphragm 610 is affixed to the diaphragm mount 608. Movement of the diaphragm mount 608 moves the diaphragm 610, displacing air within the emitter 128. The displaced air is perceived as sound. The diaphragm 610 may comprise a metal film, plastic film, paper, and so forth.

In this illustration, the emitter core 604 and the diaphragms 610 are oriented such that a plane of the diaphragm 610 is parallel to a long axis of the emitter 128. In other implementations other arrangements may be used. For example, the plane of the diaphragm 610 may be perpendicular to the long axis of the emitter 128. Likewise, a plane described by the emitter core 604 may be perpendicular to the long axis of the emitter 128.

In other implementations, the emitter core 604 may utilize other techniques to displace air. For example, the transducer 606 may comprise a piezoelectric device, a magnetostrictive device, an electrostatic device, and so forth. Continuing the example, the diaphragm 610 may comprise an electrostatically charged sheet of material, the diaphragm mount 608 may be omitted, and the transducer 606 may comprise an electrode that is driven by the signal from the AQU control circuitry 414 to change the electrostatic attraction or repulsion between the transducer 606 and the diaphragm 610, resulting in movement of the diaphragm 610.

The diaphragm 610 may separate an interior of the chassis 602 into a first duct 612 and a second duct 614. In some implementations the diaphragm 610 may provide a seal between the first duct 612 and the second duct 614. In other implementations, the diaphragm 610 may be positioned at the interface between the two, but air may move past. The first duct 612 provides a passageway from a first side of the diaphragm 610 to a first outlet port 306(1). Likewise, the second duct 614 provides a passageway from a second side of the diaphragm 610 to a second outlet port 306(2).

The outlet ports 306 may be shaped to facilitate the transfer of sound to the surrounding environment outside of the emitter 128. For example, the outlet ports 306 depicted here taper to transition from a first cross-sectional area to a larger second cross-sectional area. The first cross-sectional area occurs at the interface to the duct in the emitter 128, while the second cross-sectional area occurs at the interface between the outlet port 306 and the surrounding environment. This tapering may result in improved impedance coupling for the sound produced by the emitter core 604.

In the configuration depicted, the single emitter 128 operates as an acoustic dipole. When the electrical signal is provided to the transducer 606 that in turn moves the diaphragm 610, air is displaced. At a given instant, sound 616 with a first phase is produced by the diaphragm 610 and travels through the first duct 612, through the outlet port 306(1) and out into the ambient environment. Likewise, sound 618 with a second phase is produced by the diaphragm 610 and travels through the second duct 614, through the outlet port 306(2) and out into the ambient environment. The sound 616 emitted from the first outlet port 306(1) is opposite in phase from the sound 618 emitted from the second outlet port 306(2).

Two emitters 128 of this configuration may be paired to produce the AQU 126. For example, a pair of emitters 128(1) and 128(2) may be mounted in tandem within the temple 226.

In this and the following illustrations, the phase of the sound is illustrated using either a "+" or a "−". These symbols are used to indicate that the phases in a particular situation are different. In the implementation depicted here, the first phase 616 and the second phase 618 may be opposite one another such that they are 180 degrees out of phase. For example, where the first sound 616 comprises a compression of the air, the second sound 618 comprises a rarefaction of the air.

Figure 7:
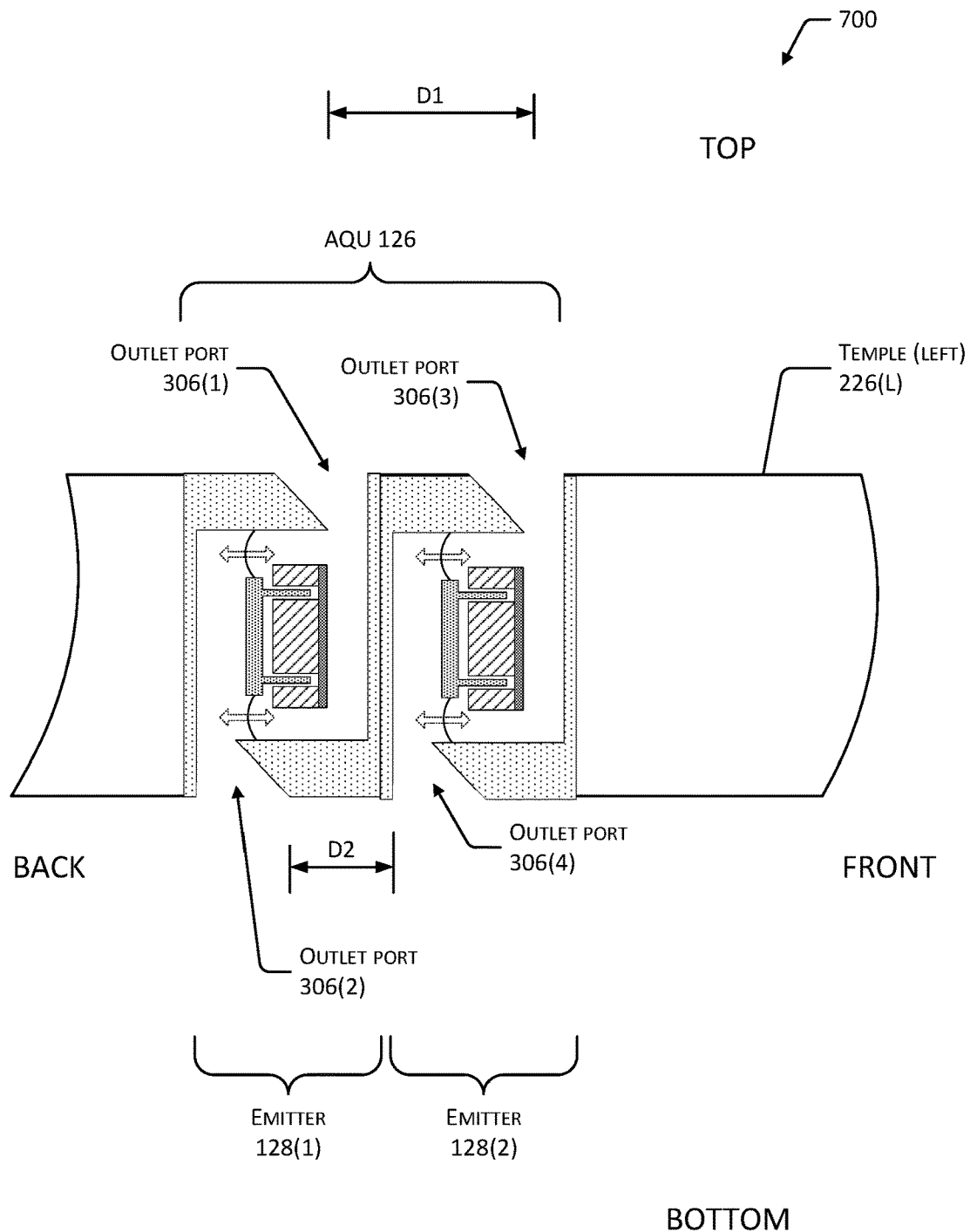
FIG. 7 is a diagram of an AQU that comprises two emitters mounted in a temple of the head-mounted wearable device, according to one implementation.

FIG. 7 is a diagram 700 of an AQU 126 that comprises two emitters 128(1) and 128(2) mounted in the left temple 226(L) of the HMWD 106, according to one implementation. It is understood that a similar arrangement may be used in the right temple 226(R) or in other devices worn near the ear of the user 102. In this illustration, the emitters 128(1) and 128(2) are adjacent to one another, mounted in tandem along a length of the temple 226. In other implementations the emitters 128(1) and 128(2) may be mounted in other configurations, such as side-by-side.

In some implementations, the two emitters 128(1) and 128(2) may share one or more common components. For example, at least a part of the chassis 602 may be used to support both a first emitter core 604(1) of the of the first emitter 128(1) and a second emitter core 604(2) of the second emitter 128(2).

As depicted here, the first emitter 128(1) includes a first outlet port 306(1) positioned in an upper surface of the temple 226(L), and a second outlet port 306(2) that is positioned in a lower surface of the temple 226(L). Similarly, the second emitter 128(2) includes a third outlet port 306(3) positioned in the upper surface of the temple 226(L), and a fourth outlet port 306(4) that is positioned in the lower surface of the temple 226(L). The first outlet port 306(1) and the third outlet port 306(3) are positioned at some distance "D1" from one another. Distance D1 may comprise the distance from a center of one outlet port 306 to the center of an adjacent outlet port 306. In some implementations the distance D1 between centers of outlet ports 306 may be between 5 mm and 10 mm. For example, the distance D1 may be 6.5 mm. Likewise, the second outlet port 306(2) and the fourth outlet port 306(4) are positioned at some distance from one another. Distance D2 may comprise a distance between the edges of adjacent outlet ports 306. In some implementations, the spacing distance D2 between the edges of adjacent outlet ports 306 may be between 0.3 and 0.8 mm. For example, D2 may be 0.5 millimeters. The shape and size of the opening of the outlet port 306 may vary. For example, the outlet port 306 may have an exterior shape that is circular, elliptical, rectangular, and so forth. For example, the outlet port 306 may comprise an opening that is rectangular with sides measuring 1 mm and 6 mm.

The distances D1 and D2 may differ for outlet ports 306 in different locations. For example, the distance D1 for the outlet ports 306(1) and 306(3) may be greater than the distance D1 for the outlet ports 306(2) and 306(4). Likewise, the distance D2 may differ between the outlet ports 306 on different sides of the temple 226.

Figure 8:
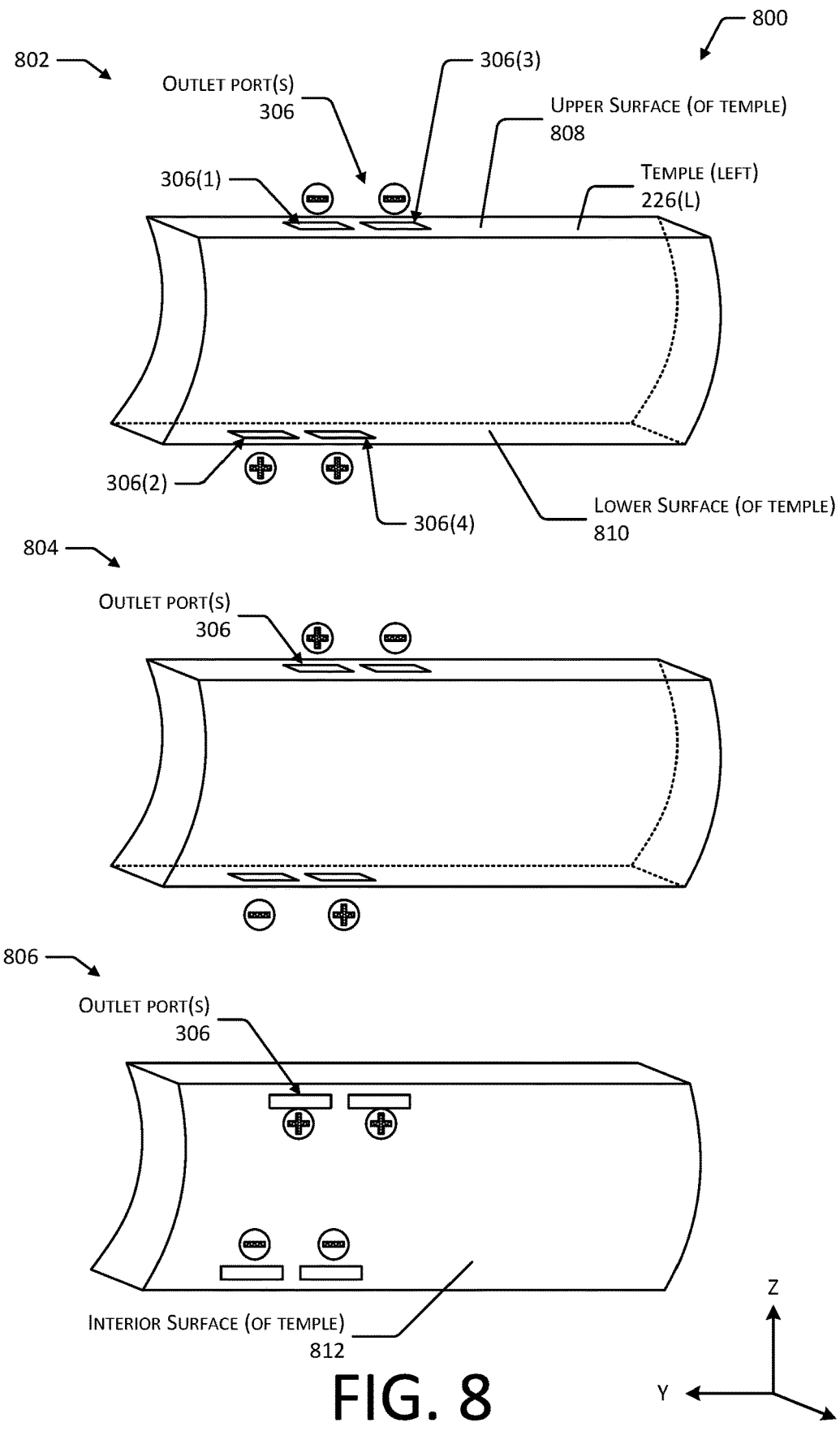
FIG. 8 depicts different arrangements of phase output for an AQU using outlet ports in the housing of the temple, according to some implementations.

FIG. 8 depicts different arrangements 800 of phase output for an AQU 126 using outlet ports 306 in the housing 402 of the temple 226, according to some implementations. Shown are three arrangements, 802, 804, and 806 of the outlet ports 306 and the phase of the sound emitted from the respective outlet ports.

The housing 402 of the temple 226 comprises an upper surface 808 and a lower surface 810. The view 802 shows an asymmetrical lateral AQU 126 arrangement. In this arrangement, the emitters 128(1) and 128(2) emit sound of the first phase 616 from the outlet ports 306(2) and 306(4) in the lower surface 810 and sound of the second phase 618 from the outlet ports 306(1) and 306(3) in the upper surface 808. For example, the emitters 128(1) and 128(2) may be driven with the same electrical signal from the AQU control circuitry 414, and may be configured such that their respective transducers 606 will produce the same direction of motion responsive to the electrical signal.

The view 804 shows the AQU 126 configured to operate with the sound of the first phase 616 emitted from the outlet port 306(1) and sound of the second phase 618 from the outlet port 306(3). Likewise, sound of the second phase 618 is emitted from the outlet port 306(2) and sound of the first phrase 616 is emitted from the outlet port 306(4).

The view 806 shows the AQU 126 with the outlet ports 306 arranged in the interior surface 812 of the temple 226(L). The interior surface 812 comprises the surface on the temple 226 that is proximate to the head 104 when the HMWD 106 is being worn. In another implementation, the outlet ports 306 may be arranged on an exterior surface of the temple 226(L). Outlet ports 306(1) and 306(3) are positioned proximate to the upper surface 808, while the outlet ports 306(2) and 306(4) are positioned proximate to the lower surface 810. In this illustration, the emitters 128(1) and 128(2) emit sound of the second phase 618 from the outlet ports 306(2) and 306(4) in the lower surface 810 and sound of the first phase 616 from the outlet ports 306(1) and 306(3) in the upper surface 808.

Figure 9:
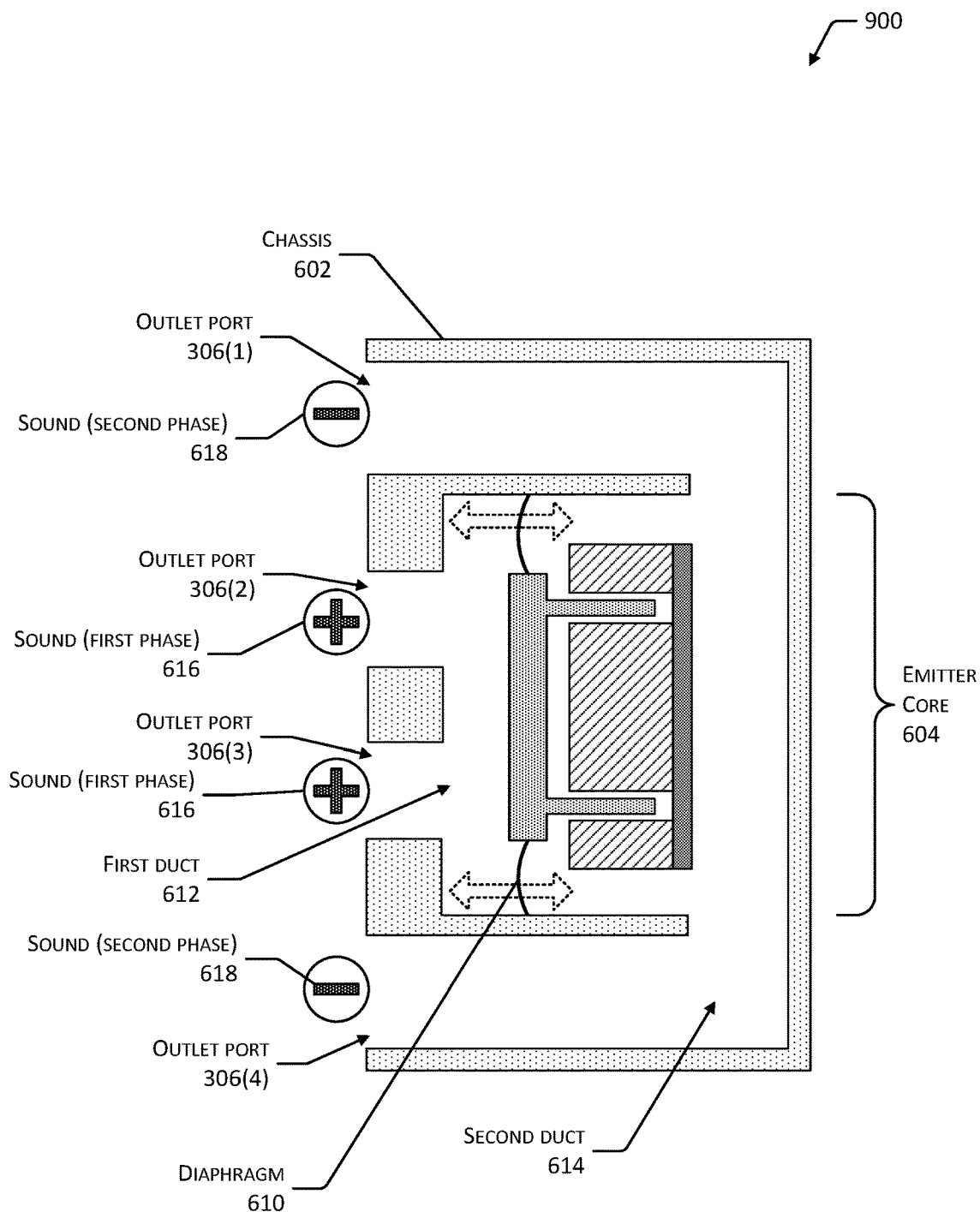
FIG. 9 is a cross-sectional diagram of an AQU, according to another implementation.

FIG. 9 is a cross-sectional diagram 900 of an AQU 126, according to another implementation. As depicted in FIG. 4, in some implementations, the outlet ports 306 may be positioned on one or more of the interior surface 812 or an exterior surface of the temple 226. The implementation of the AQU 126 depicted in this figure utilizes a single emitter core 604 and features four outlet ports 306(1)-(4).

The AQU 126 includes a chassis 602 and an emitter core 604. The chassis 602 is configured to provide four outlet ports 306(1)-(4). In this illustration, the outlet ports 306 are fed with particular phases of sound to produce a symmetric longitudinal quadrupole configuration. For example, the chassis 602 may include a first duct 612 and a second duct 614. The first duct 612 extends from a first side of the diaphragm 610 to outlet ports 306(2) and 306(3) that are positioned between outlet ports 306(1) and 306(4). The second duct 614 extends from a second side of the diaphragm 610 to outlet ports 306(1) and 306(4), that are positioned between outlet ports 306(1) and 306(4). In this configuration, during operation, the sound with a first phase 616 is emitted by outlet ports 306(2) and 306(3), while the sound with the second phase 618 is emitted by outlet ports 306(1) and 306(4).

Figure 10:
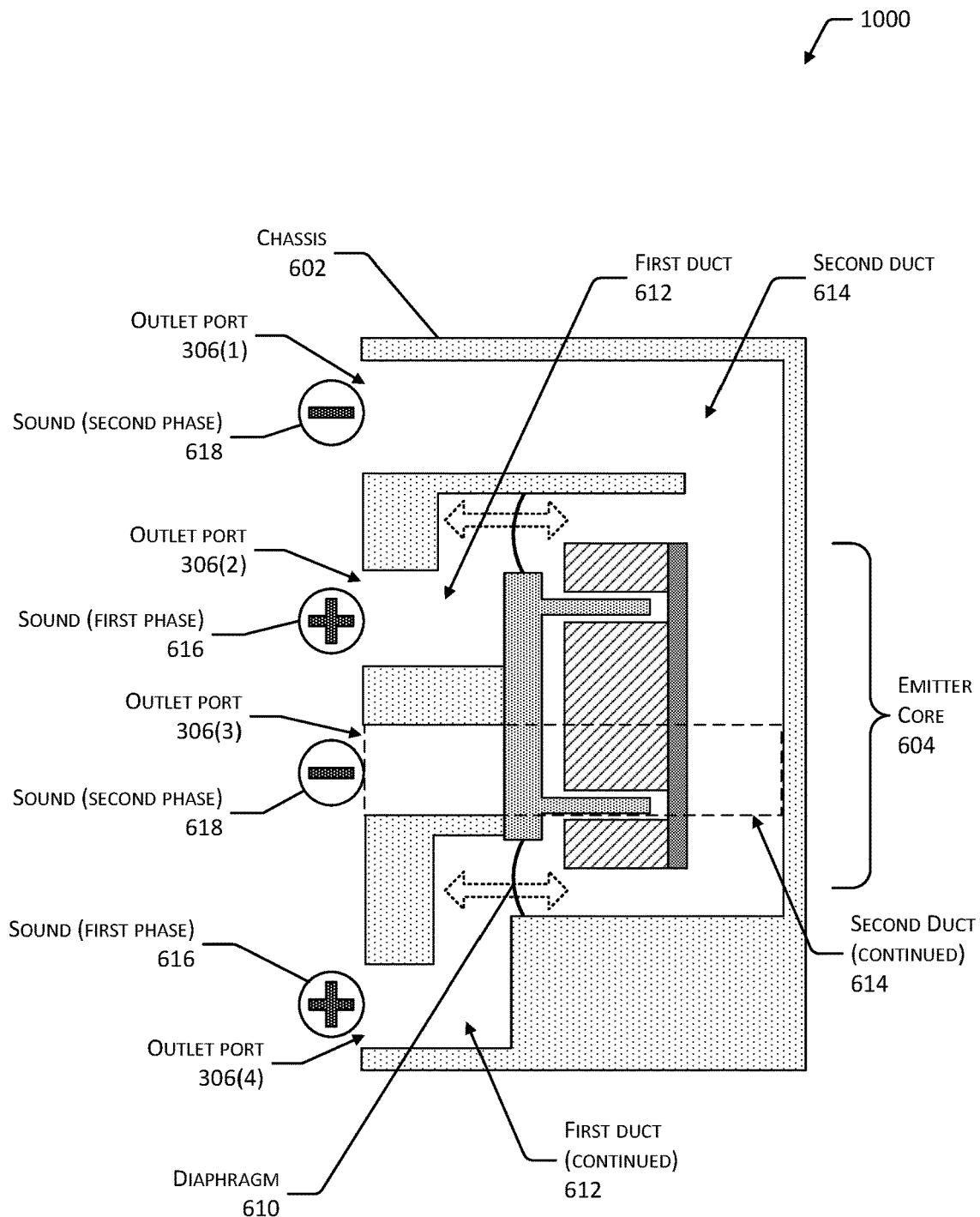
FIG. 10 is a cross-sectional diagram of an AQU, according to another implementation.

FIG. 10 is a cross-sectional diagram 1000 of an AQU 126, according to another implementation. As mentioned above, in some implementations the outlet ports 306 may be positioned along the exterior surface of the temple 226. The implementation of the AQU 126 depicted in this figure utilizes a single emitter core 604 and features four outlet ports 306(1)-(4).

The AQU 126 includes a chassis 602 and an emitter core 604. The chassis 602 is configured to provide four outlet ports 306(1)-(4). In this illustration, the outlet ports 306 are fed with particular phases of sound to produce a symmetric longitudinal quadrupole configuration. For example, the chassis 602 may include a first duct 612 and a second duct 614. The first duct 612 extends from a first side of the diaphragm 610 to outlet port 306(2) and to outlet port 306(4). The second duct 614 extends from a second side of the diaphragm 610 to outlet ports 306(1) and 306(3). For example, a portion of the second duct 614 may extend along a perimeter of the AQU 126 to avoid conflicting with the emitter core 604.

In this configuration, during operation, the sound with a first phase 616 is emitted by outlet ports 306(2) and 306(4), while the sound with the second phase 618 is emitted by outlet ports 306(1) and 306(3).

Figure 11:
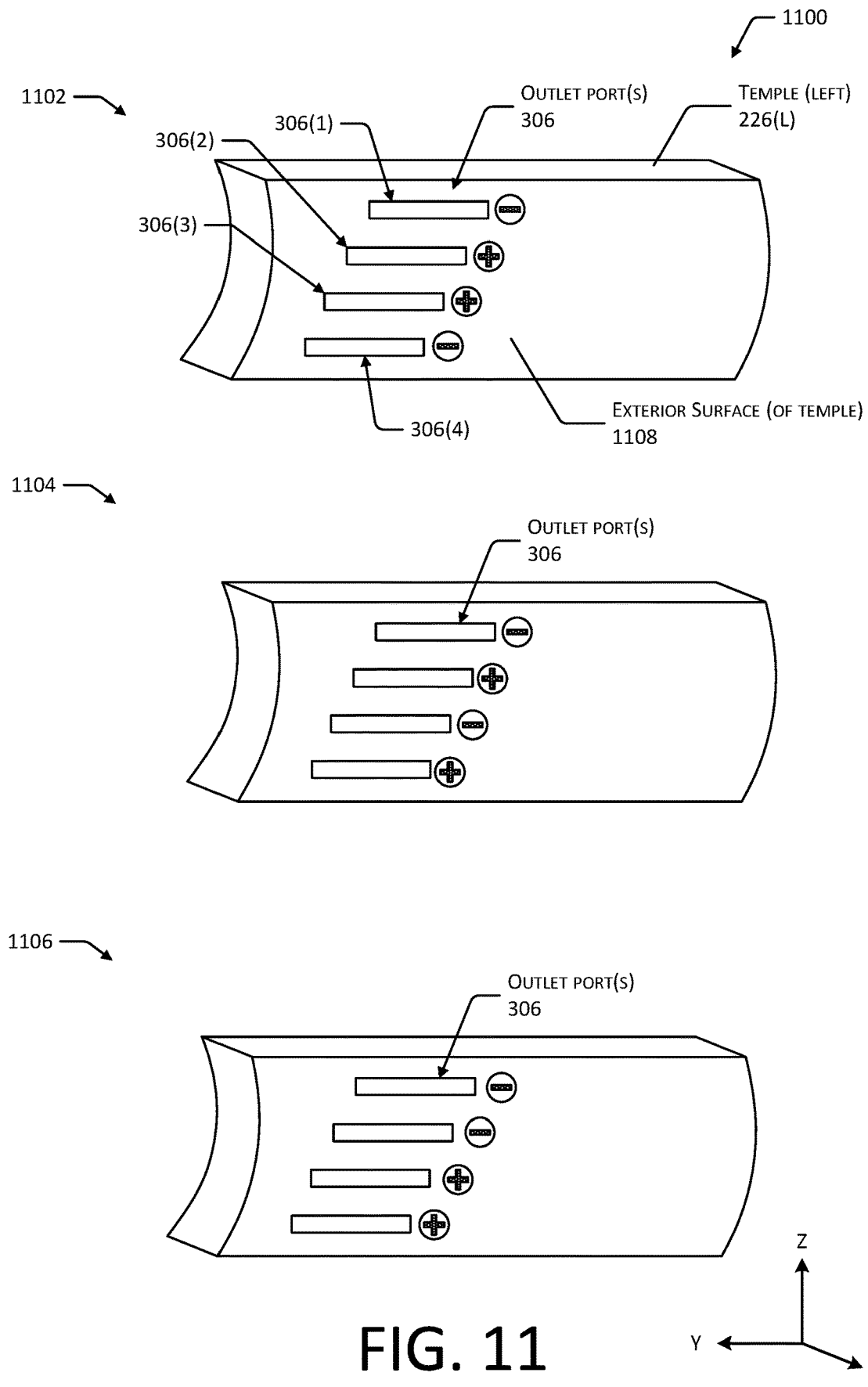
FIG. 11 depicts different arrangements of phase output for an AQU using outlet ports on an exterior surface of the temple, according to some implementations.

FIG. 11 depicts different arrangements 1100 of phase output for AQU 126 using outlet ports 306 on an exterior surface 1108 of the temple, according to some implementations. The arrangements shown may utilize the AQU 126 configurations described above with regard to FIG. 9 or FIG. 10. In other implementations, other configurations may be used. For example, individual emitters 128 configured as acoustic monopoles may be used to produce a desired phase output.

Shown are three arrangements, 1102, 1104, and 1106 of the outlet ports 306 and the phase of the sound emitted from the respective outlet ports. The housing 402 of the temple 226 comprises an upper surface 808, a lower surface 810, and an exterior surface 1108.

In these arrangements, four outlet ports 306(1)-(4) are depicted, with the outlet port 306(1) uppermost or proximate to the upper surface 808 of the temple 226. Immediately below the outlet port 306(1) is outlet port 306(2), and so on until outlet port 306(4) that is proximate to the lower surface 810 of the temple 226.

In the implementation shown, the outlet ports 306(1)-(4) are arranged in a staggered or angled orientation, such that each is displaced slightly along the front-to-back axis of the temple 226 with respect to the adjacent outlet ports 306. This staggered orientation may facilitate orienting the major axis 418 of the acoustic pattern 130 such that the lower region 232 encompasses the ear of the user 102.

The view 1102 shows the AQU 126 with the outlet ports 306 arranged and the emitter(s) 128 configured to emit sound of the second phase 618 from the outlet port 306(1) and outlet port 306(4), while sound of the first phase 616 is emitted from the outlet ports 306(2) and 306(3). For example, the AQU configuration depicted in FIG. 9 may be utilized to produce this particular pattern of phase outputs in the outlet ports 306.

The view 1104 shows the AQU 126 with the outlet ports 306 arranged and the emitter(s) 128 configured to emit sound of the first phase 616 from the outlet port 306(2) and outlet port 306(4), while sound of the second phase 618 is emitted from the outlet ports 306(1) and 306(3). For example, the AQU configuration depicted in FIG. 10 may be utilized to produce this particular pattern of phase outputs in the outlet ports 306.

The view 1106 shows the AQU 126 with the outlet ports 306 arranged and the emitter(s) 128 configured to emit sound of the second phase 618 from the outlet port 306(1) and outlet port 306(2), while sound of the first phase 618 is emitted from the outlet ports 306(3) and 306(4).

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A wearable device comprising:
   a housing within the wearable device, the housing having an upper surface, a lower surface opposite the upper surface, an interior surface, and an exterior surface;
   an acoustic quadrupole unit within the housing, the acoustic quadrupole unit comprising:
      one or more transducers;
      a first outlet port to emit sound from the one or more transducers, the first outlet port through the housing at a first location on the interior surface or the exterior surface proximate to the upper surface of the housing;
      a second outlet port to emit sound from the one or more transducers, the second outlet port through the housing at a second location on the interior surface or the exterior surface below the first location;
      a third outlet port to emit sound from the one or more transducers, the third outlet port through the housing at a third location on the interior surface or the exterior surface below the second location;
      a fourth outlet port to emit sound from the one or more transducers, the fourth outlet port through the housing at a fourth location on the interior surface or the exterior surface below the third location and proximate to the lower surface of the housing;
      a first duct that extends from the one or more transducers to the first outlet port and the second outlet port; and
      a second duct that extends from the one or more transducers to the third outlet port and the fourth outlet port; and
   control circuitry within the housing, the control circuitry connected to the one or more transducers to provide electrical signals to cause at least a portion of the one or more transducers to move.

2. The wearable device of claim 1, wherein the control circuitry is further configured to produce audio output from the acoustic quadrupole unit, the audio output comprising:
   first sound exhibiting a first phase from the first and second outlet ports; and
   second sound exhibiting a second phase that is opposite the first phase from the third and fourth outlet ports.

3. The wearable device of claim 1, wherein the one or more transducers comprise one or more of an electromagnet, piezoelectric device, magnetostrictive device, or an electrostatic device to move a diaphragm to displace air.

4. The wearable device of claim 1, wherein the control circuitry is further configured to generate a first electrical signal having a first phase to drive a first one of the one or more transducers and a second electrical signal having a second phase to drive a second one of the one or more transducers.

5. The wearable device of claim 1, wherein:
   the first, second, third, and fourth outlet ports are located on the interior surface of the housing where a side of a head of a user is expected to make contact with the wearable device while the wearable device is worn.

6. The wearable device of claim 1, wherein:
   the sound from the first outlet port exhibits a first phase;
   the sound from the second outlet port exhibits the first phase;
   the sound from the third outlet port exhibits a second phase; and
   the sound from the fourth outlet port exhibits the second phase.

7. The wearable device of claim 6, wherein the second phase is 180 degrees opposite the first phase.

8. The wearable device of claim 1, wherein:
   the first, second, third, and fourth outlet ports are located on the exterior surface of the housing that is opposite where a side of a head of a user is expected to make contact with the wearable device while the wearable device is worn.

9. The wearable device of claim 8, wherein:
   the control circuitry is configured to provide a first electrical signal to cause a first transducer of the one or more transducers to move; and
   the control circuitry is configured to provide a second electrical signal to cause a second transducer of the one or more transducers to move.

10. The wearable device of claim 8, wherein:
    the first duct extends from a first side of a first transducer to the first outlet port and the second outlet port; and
    the second duct extends from a second side of the first transducer to the third outlet port and the fourth outlet port.

11. The wearable device of claim 8, wherein:
    the sound from the first outlet port exhibits a first phase;
    the sound from the second outlet port exhibits the first phase;
    the sound from the third outlet port exhibits a second phase that is opposite the first phase; and
    the sound from the fourth outlet port exhibits the second phase.

12. The wearable device of claim 1, the acoustic quadrupole unit further comprising:
    a first transducer, wherein a first output of the first transducer is coupled to the first outlet port and a second output of the first transducer is coupled to the second outlet port; and
    a second transducer, wherein a third output of the second transducer is coupled to the third outlet port and a fourth output of the second transducer is coupled to the fourth outlet port.

13. The wearable device of claim 1, further comprising:
    a front frame comprising a left brow section and a right brow section joined by a frame bridge;
    a first hinge connected to the front frame; and
    wherein the housing is connected to the first hinge.

14. The wearable device of claim 1, wherein edges of adjacent ones of the first outlet port, the second outlet port, the third outlet port, or the fourth outlet port are separated by a minimum threshold distance of at least 0.5 millimeters.

15. A method comprising:
    accessing audio output data;
    generating, based on the audio output data, a first electrical signal and a second electrical signal to drive one or more transducers of an acoustic quadrupole unit in a chassis of a wearable device, wherein:
       the chassis comprises an upper surface, a lower surface opposite the upper surface, an interior surface, and an exterior surface; and
       the acoustic quadrupole unit comprises:
          a first outlet port at a first location on the interior surface or the exterior surface of the chassis proximate to the upper surface;
          a second outlet port at a second location below the first location;
          a third outlet port at a third location below the second location;

a fourth outlet port at a fourth location below the third location and proximate to the lower surface of the chassis;

a first duct that extends from the one or more transducers to the second outlet port and the third outlet port; and a second duct that extends from the one or more transducers to the first outlet port and the fourth outlet port;

driving a first transducer of the one or more transducers with the first electrical signal to produce sound from the second outlet port and the third outlet port exhibiting a first phase; and driving a second transducer of the one or more transducers with the second electrical signal to produce sound from the first outlet port and the fourth outlet port exhibiting a second phase that is opposite the first phase.

16. The method of claim 15, the driving the first transducer and the driving the second transducer further comprising:

providing the first electrical signal to the first transducer of the one or more transducers; and providing the second electrical signal to the second transducer of the one or more transducers.

17. The method of claim 16, wherein the first electrical signal and the second electrical signal are configured to move the first transducer of the one or more transducers and the second transducer of the one or more transducers to generate sound pressures that are the same.

18. A device comprising:

a chassis having an upper surface, a lower surface opposite the upper surface, an interior surface that is proximate to where a head of a user is expected to make contact with the device while the device is worn, and an exterior surface opposite the interior surface;

an acoustic quadrupole unit within the chassis, the acoustic quadrupole unit comprising:

a transducer;

a first outlet port to emit sound from the transducer, the first outlet port through the chassis at a first location on the interior surface or the exterior surface of the chassis proximate to the upper surface;

a second outlet port to emit sound from the transducer, the second outlet port through the chassis at a second location on the interior surface or the exterior surface that is below the first location;

a third outlet port to emit sound from the transducer, the third outlet port through the chassis at a third location on the interior surface or the exterior surface that is below the second location;

a fourth outlet port to emit sound from the transducer, the fourth outlet port through the chassis at a fourth location on the interior surface or the exterior surface that is below the third location and proximate to the lower surface;

a first duct that extends from a first side of the transducer to the second outlet port and the fourth outlet port; and a second duct that extends from a second side of the transducer to the first outlet port and the third outlet port; and control circuitry within the chassis, the control circuitry connected to the transducer to provide one or more electrical signals to cause at least a portion of the transducer to move.

19. The device of claim 18, wherein:

the sound from the first outlet port exhibits a first phase;

the sound from the second outlet port exhibits a second phase that is opposite the first phase;

the sound from the third outlet port exhibit the first phase; and the sound from the fourth outlet port exhibits the second phase.

20. The device of claim 18, wherein a portion of the second duct extends along a perimeter of the acoustic quadrupole unit and avoids an emitter core.

* * * * *

UNITED STATES PATENT AND TRADEMARK OFFICE
CERTIFICATE OF CORRECTION

PATENT NO. : 10,950,217 B1  
APPLICATION NO. : 15/839472  
DATED : March 16, 2021  
INVENTOR(S) : Jianchun Dong et al.

Page 1 of 1

It is certified that error appears in the above-identified patent and that said Letters Patent is hereby corrected as shown below:

In the Claims

Column 22, Claim 19, Line 32:  
Currently reads: "third outlet port exhibit the first phase"  
Where it should read: --third outlet port exhibits the first phase--

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*